(12) United States Patent
Faller et al.

(10) Patent No.: US 8,943,136 B2
(45) Date of Patent: *Jan. 27, 2015

(54) CREATING AND SHARING INTEREST LISTS IN A SOCIAL NETWORKING SYSTEM

(71) Applicant: Facebook, Inc., Menlo Park, CA (US)

(72) Inventors: Eric Faller, Palo Alto, CA (US); Zachary Ethan Carpen Rait, Palo Alto, CA (US); Joshua Wiseman, San Francisco, CA (US); Mark E. Zuckerberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,190

(22) Filed: Jul. 25, 2013

(65) Prior Publication Data
US 2013/0311572 A1 Nov. 21, 2013

Related U.S. Application Data

(63) Continuation of application No. 13/346,001, filed on Jan. 9, 2012, now Pat. No. 8,510,380.

(51) Int. Cl.
*G06F 15/16* (2006.01)
*H04L 29/06* (2006.01)
*G06Q 50/00* (2012.01)
*G06Q 30/02* (2012.01)

(52) U.S. Cl.
CPC .............. *H04L 65/403* (2013.01); *G06Q 50/01* (2013.01); *G06Q 30/02* (2013.01)
USPC ........................................... 709/204; 709/205

(58) Field of Classification Search
CPC ....................................................... G06Q 50/01
USPC .......................... 709/200–205, 217–227, 228
See application file for complete search history.

(56) References Cited

U.S. PATENT DOCUMENTS

| | | | |
|---|---|---|---|
| 7,827,208 B2 | 11/2010 | Bosworth et al. | |
| 7,966,325 B2 * | 6/2011 | Singh | 707/732 |
| 8,171,128 B2 | 5/2012 | Zuckerberg et al. | |
| 8,275,769 B1 * | 9/2012 | Suh et al. | 707/732 |
| 8,307,086 B2 | 11/2012 | Whitnah et al. | |
| 8,380,801 B2 * | 2/2013 | Sherrets et al. | 709/206 |
| 8,473,550 B2 * | 6/2013 | Nguyen et al. | 709/204 |
| 8,510,380 B2 * | 8/2013 | Faller et al. | 709/204 |
| 2008/0133649 A1 | 6/2008 | Pennington et al. | |
| 2008/0270038 A1 | 10/2008 | Partovi et al. | |
| 2009/0172127 A1 | 7/2009 | Srikanth et al. | |
| 2009/0282144 A1 | 11/2009 | Sherrets et al. | |
| 2010/0082593 A1 | 4/2010 | Singh | |
| 2012/0166532 A1 | 6/2012 | Juan et al. | |
| 2012/0179980 A1 | 7/2012 | Whalin et al. | |
| 2012/0209907 A1 | 8/2012 | Andrews et al. | |
| 2012/0215846 A1 * | 8/2012 | Howes et al. | 709/204 |
| 2012/0265771 A1 | 10/2012 | Suh et al. | |
| 2012/0331063 A1 | 12/2012 | Rajaram | |
| 2013/0073984 A1 | 3/2013 | Lessin et al. | |
| 2013/0085828 A1 * | 4/2013 | Schuster | 705/14.25 |
| 2013/0117097 A1 * | 5/2013 | Bachman | 705/14.39 |

* cited by examiner

Primary Examiner — Moustafa M Meky
(74) Attorney, Agent, or Firm — Fenwick & West LLP

(57) ABSTRACT

A social networking service allows a user of the service to create an interest list associated with a topic of interest, where the interest list includes members that may post content via the social networking service. Members of the interest list may post content associated with the topic. Other users of the social network service may subscribe to the list, and these subscribers may then receive a feed that contains the content posted by the members of the interest list.

20 Claims, 8 Drawing Sheets

CREATING AND SHARING INTEREST LISTS IN A SOCIAL NETWORKING SYSTEM

CROSS-REFERENCE TO RELATED APPLICATIONS

This application is a continuation of U.S. patent application Ser. No. 13/346,001, filed on Jan. 9, 2012, which is incorporated by reference in its entirety.

BACKGROUND

The present disclosure relates generally to social networking services, and more particularly to facilitating a user's creation of an interest group of other users from among the user's connections in the user's social network. As used herein, a "user" can be an individual or an entity (such as a business or third party application). The term "connection" refers to individuals and entities with which a user of the social networking service may form a connection, association, or other relationship.

Users of social networking services may form connections, associations, or other relationships with other users based on real-life interactions, online interactions, or a mixture of both. For example, users may be from the same geographic location, may travel in the same circle of friends, or may have attended the same college or university. Content posted by a user may be made available to the user's connections via one or more of various communication channels in the social networking system, such as a newsfeed or stream.

However, conventional social networking services lack a connection grouping mechanism that provides users with content that is associated with a particular topic.

SUMMARY

To enhance the user experience of the social networking service provided by a social networking system, the embodiments disclosed herein allow a user to curate or create an interest list that is associated with a topic of interest. Members of the interest list post content that is associated with the topic of interest. Subscribers of the interest list, who may include the user who created the list, receive the posted content from the members as a dedicated type of feed.

In one embodiment, the curator may add one or more members to the interest list. Alternatively, the social networking service may automatically suggest to the curator to add particular users of the social networking system that post content associated with the topic of the interest list as members of the interest list. The curator may thereafter accept or decline the suggestions from the system.

In one embodiment, users of the social networking system request to subscribe to an interest list, or the curator may manually add other users as subscribers to the interest list. Alternatively, the social networking service provides a suggestion to particular users of the social networking system to subscribe to an interest list based on inferred interests of the users that are associated with the topic of the interest list.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
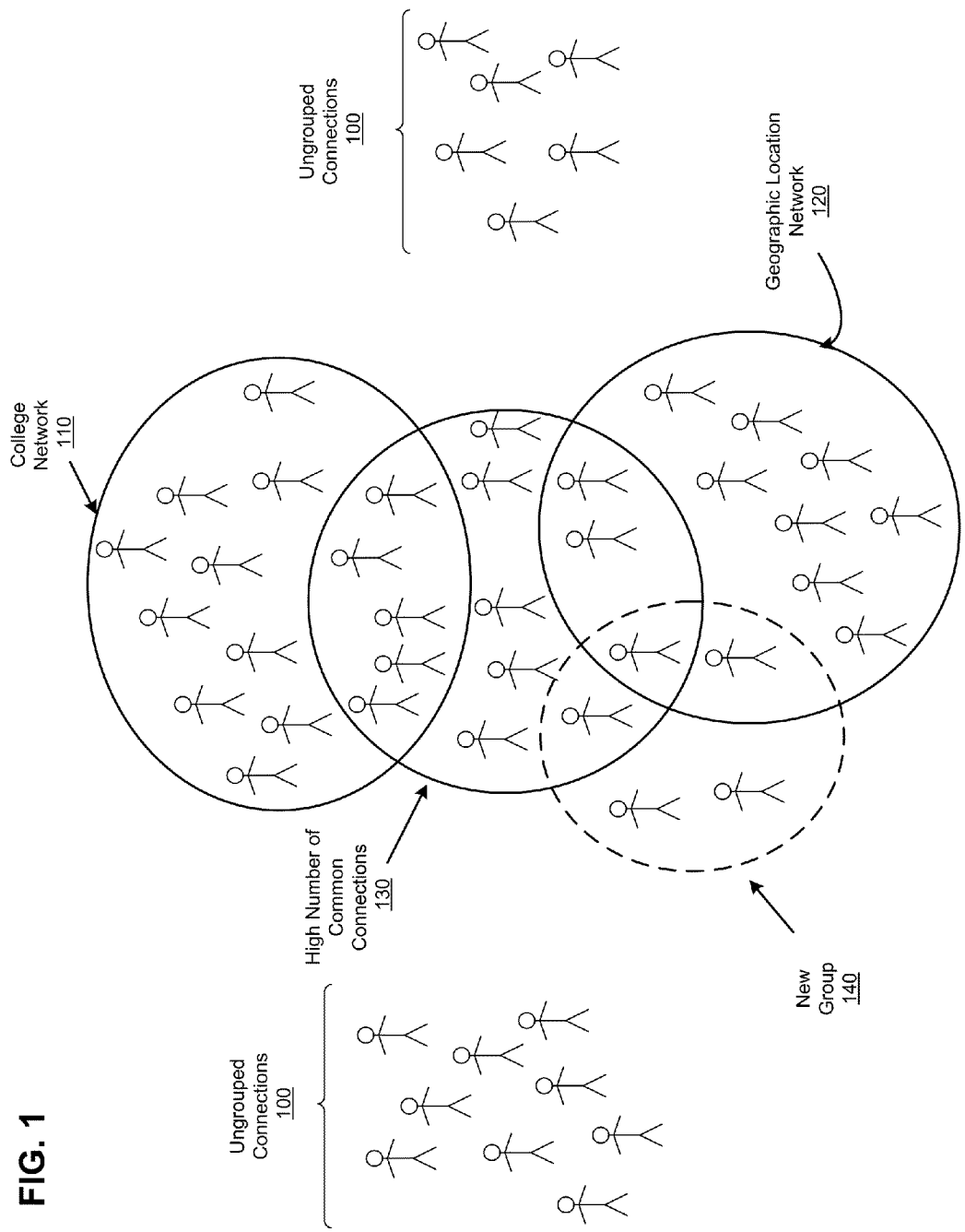
FIG. 1 illustrates a high-level conceptual diagram describing connections of a user within various groups, or subsets, in a social networking system, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

A social networking system offers its users the ability to communicate and interact with other users of the social networking system. In use, users join the social networking system and then connect with other users, individuals, and entities to which they desire to be connected. Connections may be added explicitly by a user, for example, the user selecting a particular other user to be a friend, or automatically created by the social networking system based on common characteristics of the users (e.g., users who are alumni of the same educational institution). Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends).

In addition to interactions with other users, the social networking system provides users with the ability to take actions on various types of items supported by the service. These items may include groups or networks (where "networks" here refer not to physical communication networks, but rather social networks of people) to which users of the service may belong, events or calendar entries in which a user might be interested, computer-based applications that a user may use via the service, transactions that allow users to buy or sell items via the service, and interactions with advertisements that a user may perform on or off the social networking system. These are just a few examples of the items upon which a user may act on a social networking system, and many others are possible. Though many of the embodiments and examples provided herein are directed to particular embodiments of a social networking system, other embodiments may include other environments involving different types of social networks, social content, and other types of websites and communication mechanisms.

User generated content enhances the user experience on the social networking system. "Content" may include any type of media content, such as status updates or other textual messages, location information, photos, videos, advertisements, and links. Content "items" represent pieces of content that are represented as objects in the social networking system. In this way, users of a social networking system are encouraged to communicate with each other by "posting" content items of various types of media through various communication channels. Using communication channels, users of a social networking system increase their interaction with each other and engage with the social networking system on a more frequent basis. One type of communication channel is a "stream" in which a user is presented with a series of content items that are posted, uploaded, or otherwise provided to the social networking system from one or more users of the service. The stream may be updated as content items are added to the stream by users. Communication channels of an example social networking system are discussed further in U.S. application Ser. No. 12/253,149, filed Oct. 16, 2008, which is hereby incorporated by reference in its entirety.

As a user becomes connected with a large number of other users of the social networking system, the user may wish to view certain users' generated content more often than, or separately from, other users' generated content. For example, a user may have close friends, casual acquaintances, college roommates, co-workers, professional contacts, and family members as connections on the social networking system. Delineating the boundaries between these connections is desirable because the user may wish to view content from close friends and family, for example, before content from professional contacts.

Users may connect for many different reasons on a social networking system. For example, a user's connections in a social network may be grouped by the type of connection shared in real life, such as co-workers, housemates, teammates, classmates, travel companions, relationships, relatives, and random connections. As shown in FIG. 1, however, a user may have many ungrouped connections 100 and only a few grouped connections. A user may create a group of connections that share the same college network 110 or a group that shares the same geographic location 120. Another group 130 may include connections that share a high number of common connections with each other. Each of the connections in these groups have many different characteristics, such as age, gender, affinities, interests, geographic location, college networks, memberships in groups, fan pages, and the like. A user may manually create a new group of connections 140. This new group of connections 140 is a subset of the entire set of the user's connections of the user's social network. In one embodiment, the new group of connections 140 may be related to a topic of interest of the user otherwise known as an interest list. The interest list comprises a list of members that provide content corresponding to a topic that is associated with the interest list as will be further described below.

System Architecture

Figure 2:
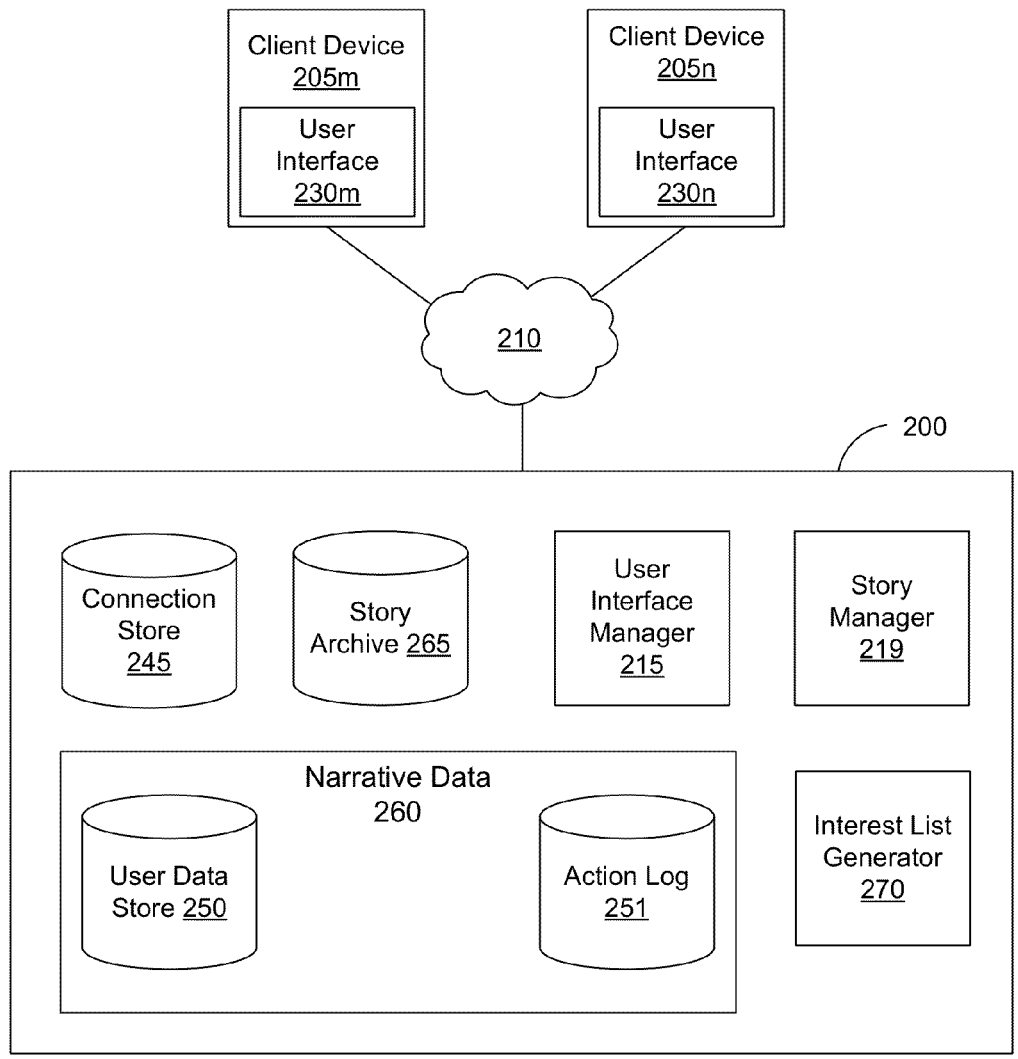
FIG. 2 illustrates a high-level block diagram of a system for creating interest lists in a social networking system, in accordance with one embodiment.

FIG. 2 illustrates a diagram of a system environment for creating interest lists in a social networking system 200. In one embodiment, an interest list is associated with a topic of interest. A curator of the list (i.e., a user of the social networking system 200) creates the interest list associated with a topic of interest. For example, a curator may be a photography enthusiast that creates an interest list about photography. The interest list comprises a plurality of members such as people or pages (i.e., non-people entities such as STARBUCKS or NFL). In one embodiment, members of an interest list do not add themselves to an interest list. The members merely post content in the social networking system 200 related to the topic of the interest list. In one embodiment, the curator of an interest list may add members to the interest list. Alternatively, the social networking system 200 may automatically suggest to the curator people or pages that post about the topic of his or her interest list so that the curator may decide whether to add the suggested people or pages to the interest list.

Subscribers of the interest list receive content from the members of the interest list that is related to the topic. In one embodiment, a subscriber is a user of the social networking system 200 that is interested enough in a topic to subscribe to an interest list about the topic in order to receive content from members of the interest list. For example, users of the social networking system 200 that are interested enough in photography to subscribe to a photography interest list may receive content from members of the photography interest list. Thus, interest lists may be considered channels of content associated with particular topics.

Users interact with the social networking system 200 using client devices 205. In one embodiment the client device 205 used by a user for interacting with the social networking system 200 may be any computing device with a screen and network communication capability such as a personal computer (PC), a desktop computer, a laptop computer, a notebook, tablet PC, a personal digital assistant (PDA), mobile telephone, smartphone, or internet tablet. These devices may include a camera sensor that allows image and video content to be captured and uploaded to the social networking system 200. These devices may also have a touch screen, gesture recognition system, mouse pad, or other technology that allows a user to interact with the social networking system 200 through a user interface provided by the social networking system 200.

In one embodiment, the client device 205 executes a user interface 230 to allow the user to interact with the social networking system 200. The user interface 230 allows the user to perform various actions or activities associated with the social networking system 200 and to view information provided by the social networking system 200. The actions performed using the user interface 230 include adding connections, posting messages, posting links, uploading images or videos, updating the user's profile settings, viewing stories, and the like. The information provided by the social networking system 200 that can be viewed using the user interface 230 includes, images or videos posted by the user's connections, comments posted by the user's connections, messages sent to the user by other users, and wall posts.

In one embodiment, when a user 'A' views the data of another user 'B' the first user 'A' is called the 'viewing user', and the second user 'B' is called the 'subject user'. The user interface 230 allows viewing users to view the data of other subject users of the social networking system 200 as well as general data related to news, sports, interests, etc. Information in the user interface 230 may be presented to viewing users in different views. For example, the social data of subject users can be presented to viewing users by way of a "profile page," which is an arrangement of the users' social networking data. The information about subject users may also be presented in the form of a news feed containing stories. In one embodiment the different views consist of data and code in a web standard format presented through a browser. For example, a news feed may consist of combination of any of XML, HTML, CSS, JavaScript, plaintext and Java sent from a server to a web browser running on a client. In another embodiment a news feed may consist of data formatted for presentation through a mobile app or desktop application.

A social network story (or just "story") is an aggregation of data gathered by the social networking system 200 that is configured for display in various social networking system views (user interface views). For example, stories can be presented to viewing users in a continuously updated real-time newsfeed in a web browser, or in a timeline view, or on a user's profile page. A story aggregation is simply a collection of one or more stories gathered together for display. For example, all the stories related to a particular event, such as a birthday party, may be aggregated into one story aggregation.

The interactions between the client devices 205 and the social networking system 200 are typically performed via a network 210, for example, via the internet. The network 210 enables communications between the client device 205 and the social networking system 200. In one embodiment, the network 210 uses standard communications technologies and/or protocols. Thus, the network 210 can include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc.

The social networking system 200 offers its users the ability to communicate and interact with other users of the social networking system 200. Users join the social networking system 200 and then add connections to other users of the social networking system 200 to whom they wish to be connected. These connected users are called the "friends" of the user. When a user joins the social networking system 200 they may create a user account. The user account enables the user to maintain a persistent and secure identity on the social networking system 200. The user account may include a user profile that stores details about the user, such as name, age, sex, etc. The social networking system 200 may provide a stream of data to a user to keep the user updated on the activities of the user's friends, as well as to inform the user about news and information related to the user's interests. This stream of data may include stories and story aggregations. The stories are collections of related data that are presented together to a user.

The social networking system 200 maintains different types of data objects, for example, user data objects, action objects, and connection objects. A user data store 250 comprises user data objects. In one embodiment, a user data object comprises information related to a user of the social networking system 200. For example, a user data object may store a user's date of birth, or may store a photo of the user, or may store a reference to a photo of the user. A connection store 245 stores connection objects. In one embodiment, a connection object comprises information describing the relationship between two users of the social networking system or in general any two entities represented in the social networking system 200.

The action log 251 comprises action objects. In one embodiment, an action object comprises information related to actions or activities performed by users of the social networking system 200 which have been logged in order to enhance the users experience in the social networking system 200. Almost any activity of a user of a social networking system can be stored as an action. For example, an action can be the posting of a new comment or status update, or it can be something as simple as forming a connection to another user. The user data included in the user data store 250 and the action objects included in the action log 251 are collectively considered narrative data 260.

The social networking system 200 may maintain a social graph that tracks the relationship between the various objects, users, and events captured by the social networking system 200. In the social graph the users, the user data, and other entities, exist as nodes that have edges that are connections to other nodes. In this embodiment the edges represent actions that create a relationship between the nodes. For example, a node representing a photograph stored in the social networking system 200 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing posts made by that user. These edges may all be "posted by" actions. The edges in the social graph can have different types that correspond to the different types of actions taken by users of the social networking system 200.

The social networking system 200 may maintain or compute a measure of a user's "affinity" for other users (or objects) in the social networking system 200. The measure of affinity may be expressed as an affinity score, which may represent that user's closeness to another user (or object) of the social networking system 200. The affinity score of a user X for another user Y can be used to predict, for example, if user X would be interested in viewing or likely to view a photo of user Y. The affinity scores can be computed by the social networking system 200 through automated methods, including through predictor functions, machine-learned algorithms, or any other suitable algorithm for determining user affinities. The social networking system 200 may store an archive of historical affinity scores for a user as their affinity scores for various users and objects changes over time. Systems and methods for computing user affinities for other users of a social networking system 200, as well as for other objects in the system, are disclosed in U.S. application Ser. No. 12/978,265, filed on Dec. 23, 2010, which is incorporated by reference in its entirety.

The social networking system 200 also comprises a user interface manager 215. The user interface manager 215 provides the server-side functionality that allows users of the social networking system 200 to interact with the social networking system 200 using the user interface 230. When users request information from the social networking system 200, the user interface manager 215 dispatches the requested information to users in a format that can be displayed through the client device 205. For example, when a user requests a news feed from the social networking system 200, the user interface manager 215 may send stories and story aggregations to the client devices 205 that are configured to be displayed on the device 205. Depending on the type of information requested by a user, the user interface manager 215 may send stories, story aggregations, profile pages, timelines, or other data to the client device 205. Stories, story aggregations, profile pages, and timelines are discussed in more detail herein.

The story manager 219 manages the story generation process. The story manager 219 comprises many different types of story generators configured to generate stories for different purposes (i.e. different views). The generated stories are stored in the story archive 265. Story generators are configured to generate stories for a particular target view, and they may restrict the selection of narrative data that they use in story generation based on the target view. For example, a story generator may be configured to generate stories for a photo album view, and based on this purpose it may restrict the narrative data that it uses to generate stories to narrative data that contains or references images. Stories generated to be displayed in a user interface may contain different data than stories generated to be displayed in a desktop PC interface, and they may be visually formatted in a different way in order to optimize for the differences between a PC display and tactile display (e.g. larger icons for a smaller smartphone screen). The social networking system 100 may also restrict the stories that are provided to a viewing user to stories that contain data related to the connections of the viewing user, i.e. to stories containing data about subject users that are connected to the viewing user in the social networking system 100.

In one embodiment, a newsfeed comprises a scrollable list of the most relevant recent stories that may be of interest to a viewing user. Relevance may be determined by the story manager 219 based on affinity or other factors. A timeline is a chronological list of stories related to a particular subject user that are ordered by time period. In some embodiments, a timeline may alter the ranking of some stories depending on other factors such as social importance or likely engagement value. Stories that are configured for display in a timeline are called timeline units. A timeline may also include special "report" units, which consist of multiple timeline units that have been aggregated together. For example, a user may have several wall posts from friends during the month of November. That user's timeline can then include a report unit containing all posts from friends during that month. For newsfeeds and timelines there may be multiple story generators producing stories of different types that are displayed together. Systems and methods for generating stories for a newsfeed from data captured by a social networking system are disclosed in U.S. application Ser. No. 11/503,037, filed on Aug. 11, 2006, and U.S. application Ser. No. 11/502,757, filed on Aug. 11, 2006, which are incorporated by reference in their entirety. Timelines and timeline units are discussed in more detail in utility application U.S. application Ser. No. 13/239,347, filed on Sep. 21, 2011, which is also incorporated by reference in its entirety.

The interest list generator 270 generates interest lists for users who are curators of the lists based on those users' requests to add entities to their lists. As mentioned above, an interest list is associated with a topic of interest and comprises a group of members that post content related to the topic of interest. In one embodiment, members of an interest list are generally public figures that post about a particular topic. For example, for a puppies interest list, curator may add a famous dog trainer, such as Cesar Millan, as a member of the list. A member of an interest list may or may not be connected to the curator of the interest list in the social networking system 200.

Generally, members of an interest list function as publishers that are responsible for content posted in an interest list that is received by consumers of the content, such as the subscribers to the interest list. Subscribers of the interest list receive content from the members of the interest list, but do not receive content in the interest list from other subscribers by virtue of having subscribed to the list. Subscribers and members of an interest list may or may not be connected to the curator of the interest list in the social networking system 200. In one embodiment, a member of an interest list and/ or the curator may also be a subscriber to the interest list.

Figure 3:
FIGS. 3-7 illustrate interest list screenshots, in accordance with an embodiment.

Members of an interest list may not be aware of the existence of the interest list. These members just post publically in the social networking system 200 and subscribers of the interest list receive these posts in a consolidated manner. A member of an interest list may post content items that are related to the topic of the interest list such as textual content, multimedia content, video content, and/or audio content. FIG. 3 illustrates an example user interface of a "Puppies" interest list 300 about the topic 301 of puppies. The interest list 300 indicates the curator 303 of the interest list 300 and the number 305 of subscribers to the interest list 300. As shown in FIG. 3, the interest list 300 comprises a plurality of posts associated with the topic of puppies that have been made by members of the puppies interest list. For example, post 307 illustrates a plurality of pictures of dogs from a member of the interest list 300. In one embodiment, subscribers of an interest list use the list as a dedicated type of feed to receive content related to the topic of the interest list. Thus, a user that is subscribed to the interest list may receive a news feed of posts from members of the interest list that contain content related to the interest list.

Figure 4:
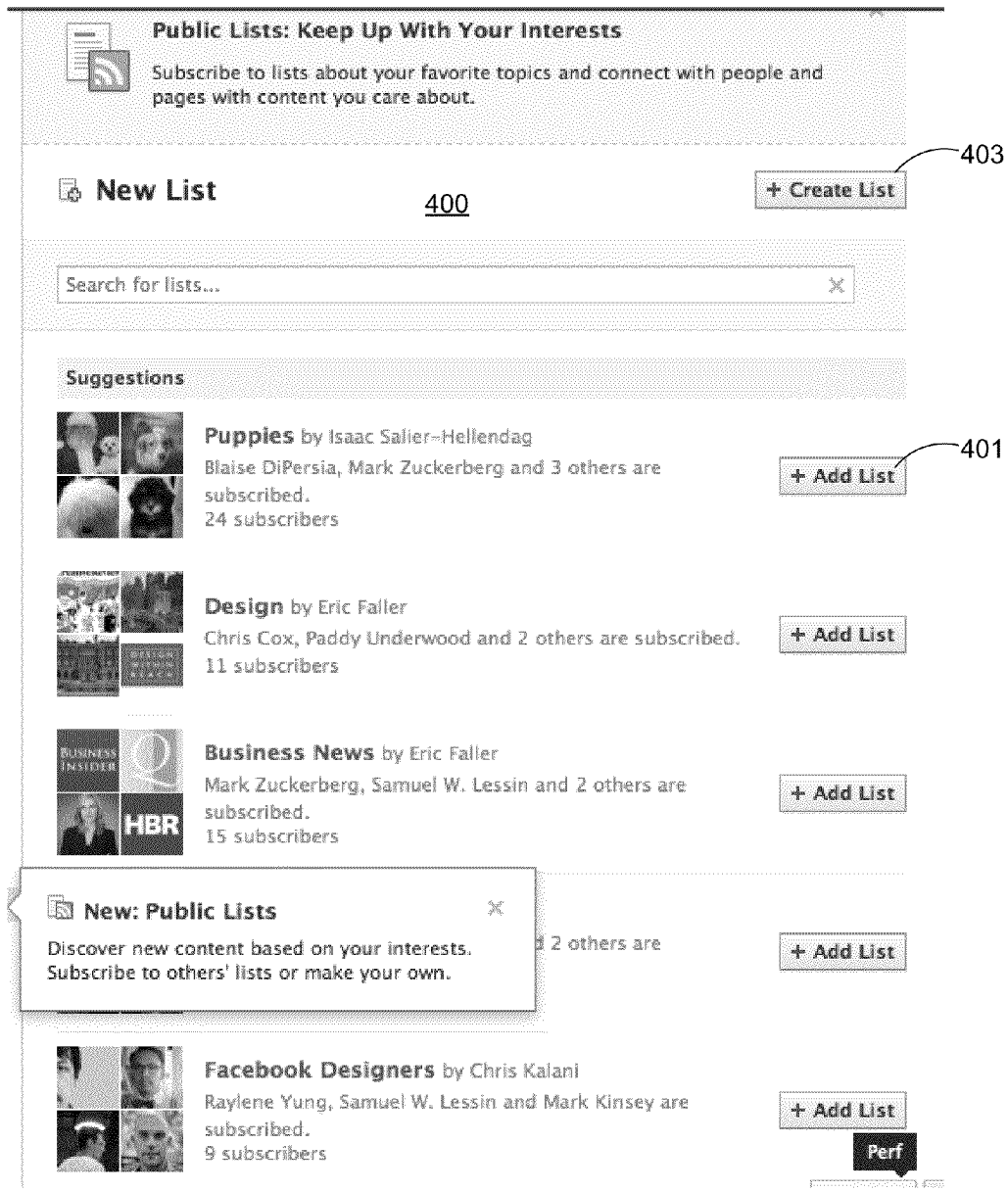

FIG. 4 illustrates one example of a list of interest lists 400 available on the social networking system 200. A user may browse the interest lists and select the "add list" button 401 to subscribe to an interest list from which the user wants to receive content. A user may also curate (i.e., create) a new interest list by selecting the "create list" button 403.

Figure 5:
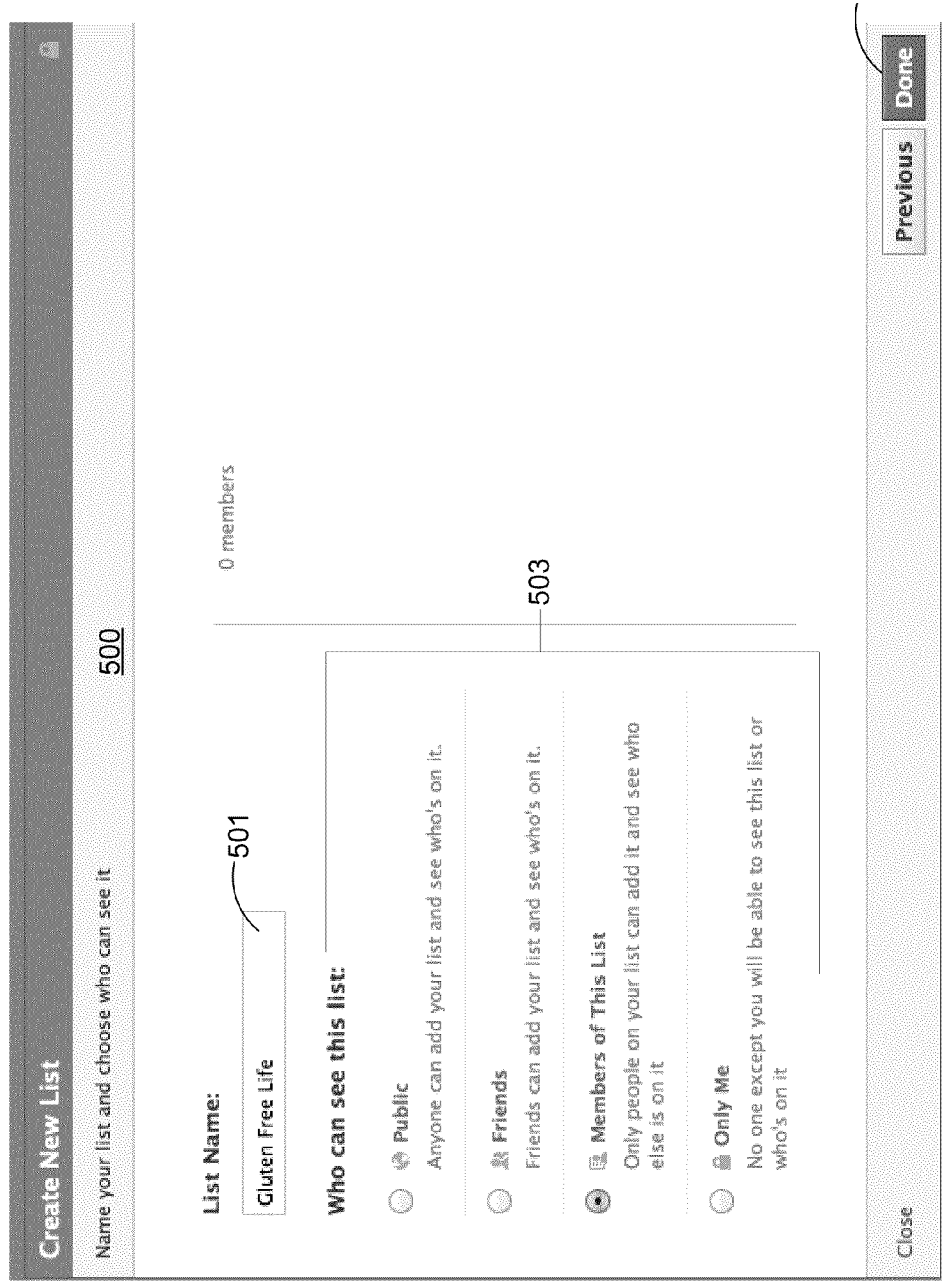

The request to create the interest list is received by the interest list generator 270. The interest list generator 270 may provide a setup page 500 to the user that submitted the request as illustrated in FIG. 5. The setup page 500 comprises a text field 501 in which the curator provides the name of the interest list which represents the topic of the list. In the example shown in FIG. 5, the name of the new interest list is "Gluten Free Life."

In one embodiment, the interest list generator 270 allows the curator that created the interest list to specify the privacy settings 503 associated with the newly created list. In one embodiment, the curator may specify that the interest list is "public" such that anyone in the social network can see the members of the interest list. Furthermore, if an interest list is public, any user in the social network may subscribe (i.e., join) the interest list. Alternatively, the curator may specify that the interest list is only available to the user's friends. Thus, only friends of the curator may see the members of the interest list as well as subscribe to the interest list. In another embodiment, an interest list may only be shared with the members of the list. Thus, only members of the interest list can see what other members are included in the list. Alternatively, an interest list may only be viewable to the curator that created the interest list. Thus, the interest list is private to the curator and no one else except the curator may view the list. Once the curator has specified the privacy settings for the interest list, selection of the "done" button 505 results in the interest list generator 270 creating the interest list.

Figure 6:
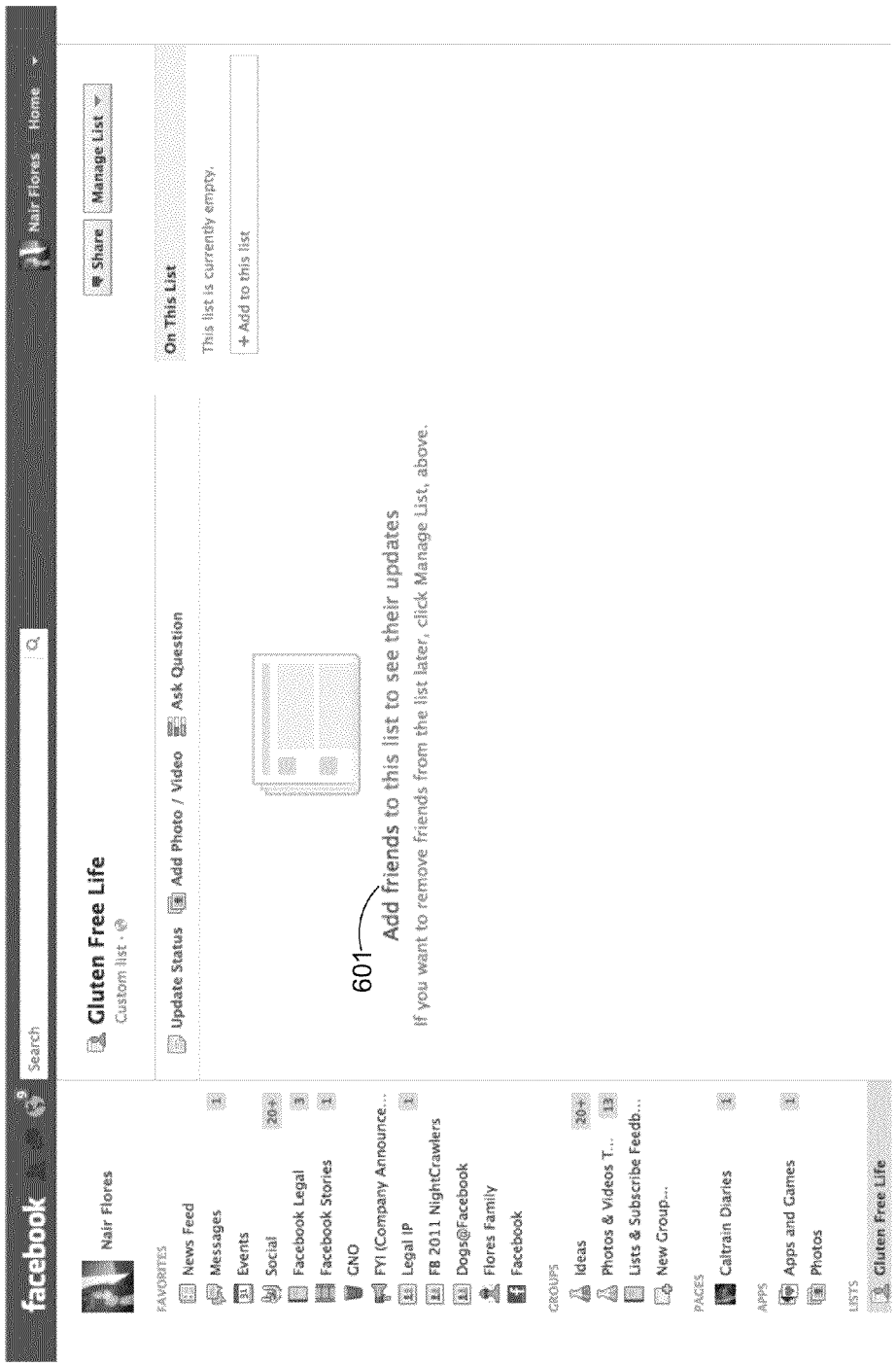
Figure 7:
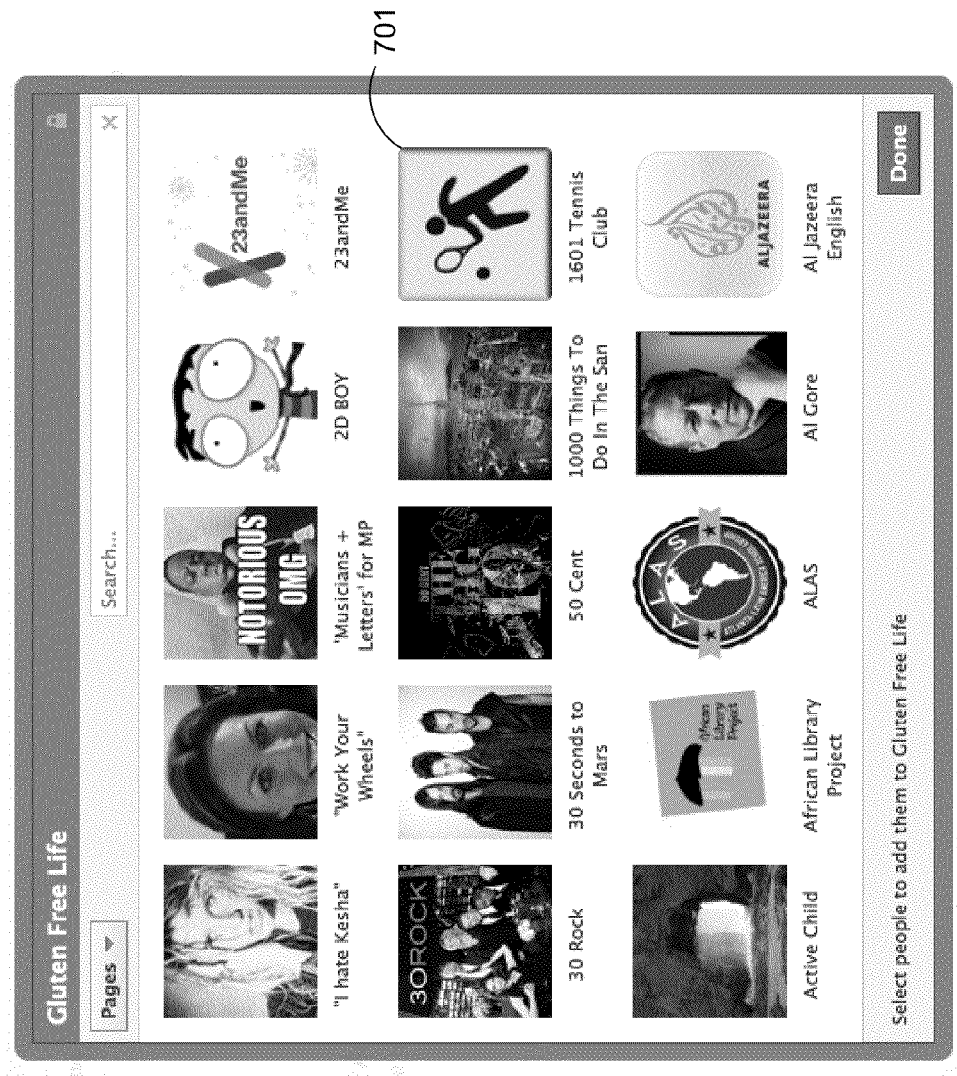

In one embodiment, members are manually added to an interest list. The interest list generator 270 may receive requests from the curator to add other users to the interest list as members. For example, FIG. 6 illustrates a user interface in which the user may specify a request to add other users to the "Gluten Free Life" interest list by selecting the "add friends" button. FIG. 7 illustrates a user interface in which the friends of the user in the social networking system 200 are provided. Each user in FIG. 7 is represented by an avatar 701. The curator may select another user in the social networking system 200 to add as a member of the list. As mentioned above, the users may not have a relationship with the curator in the social networking system 200. Alternatively, members of an interest list may be friends of the curator.

In one embodiment, the interest list generator 270 may automatically add members to an interest list based on posts of users in the social networking system 200 that are associated with the topic of the interest list. That is, the interest list generator 270 identifies users that consistently post content about the topic associated with an interest list. The interest list generator 270 may suggest to the curator to add the identified users as members of the interest list.

To identify users who post about a topic of an interest list, the interest list generator 270 may perform a topic analysis on a user's posts in the social networking system 200 to determine topics associated with the posts. Generally, the interest list generator 270 may identify anchor terms in posts of the user and determines the meaning of the terms as further described in U.S. application Ser. No. 13/167,701, filed Jun. 224, 2011, which is hereby incorporated by reference in its entirety. For example, if the post contains the text "Go Sharks!", the interest list generator 270 may query a dictionary to identify candidate topics containing the term "sharks" such as: Shark (animal), San Jose Sharks (hockey team), Jumping the Shark, and Loan Shark. In one embodiment, candidate topics represent potential meanings for an identified anchor term.

In one embodiment, interest list generator 270 eliminates particular candidate topics determined to be irrelevant to the anchor term. The interest list generator 270 identifies irrelevant candidate topics by identifying and analyzing terms other than the anchor term in the post in view of each candidate topic. The interest list generator 270 may use a category tree to determine a measure of similarity or relatedness between candidate topics and identified terms in the post. The interest list generator 270 may eliminate one or more candidate topics based on the measure of similarity or relatedness received from the category tree.

The interest list generator 270 selects a candidate topic from among the relevant candidate topics as most likely to represent the meaning of the anchor term. In one embodiment, the interest list generator 270 generates a score for each candidate topic that is based on context words for the anchor term in the post, based on the user's declared interests, based on a global context of the post, and based on a social context of the post. The interest list generator 270 then selects a candidate topic based on the generated scores that represents the topic for the anchor term. The interest list generator 270 may also infer topics of interest to a user from posted videos or pictures. The interest list generator 270 may also identify a topic associated with video/pictures based on associated textual metadata that describes the content of the video/pictures.

In one embodiment, the interest list generator 270 maintains topic counts for users and updates the topic counts based on identified topics of the users' posts described above. A topic count is associated with a topic and a user and indicates a number of times that the user has posted content in the social networking system 200 that is associated with the topic. Responsive to the topic count of a user exceeding a threshold, the interest list generator 270 may suggest to the curator of the interest list to add the user as a member of the interest list since the user posts a lot about the topic of the curator's interest list. Alternatively, the interest list generator 270 may match the topic associated with the topic count with the topic of an interest list and automatically add the member to the interest list. The interest list generator 270 may also identify the frequency in which the user posts content associated with a topic when determining whether to suggest to the curator the addition of a user as a member of the curator's interest list.

In one embodiment, the curator of an interest list may manually add his or her friends in the social networking system 200 as subscribed users to an interest list to allow the friends to receive content associated with the interest list. In one embodiment, the interest list generator 270 may automatically add the curator's friends (or friends of a subscriber) to an interest list based on interests of the friends. That is, for a friend of the curator, the interest list generator 270 may identify which of the friends in the social networking system 200 to add to the interest list based on the interests of the friends that are associated with the topic of the interest list. In one embodiment, the interest list generator 270 determines whether to add the curator's friend to an interest list based on declared interests included in the friend's profile. The interest list generator 270 may analyze user profiles of users that are friends of the curator to an interest list to determine which users have specified an interest in a topic that is associated with the interest list. For example, if a user profile specifies a user's interest in dogs, the interest list generator may add the user to the "puppies" interest list.

In one embodiment, the interest list generator 270 automatically subscribes the curator's friends to an interest list based on inferred interests that are associated with the topic of the interest list. The interest list generator 270 may infer interests of the friends based on their activities (i.e., actions) in the social networking system 200. For example, the interest list generator 270 may perform a topic analysis on a user's posts in the social networking system 200 to determine topics associated with the posts. The interest list generator 270 may also infer topics of interest to a user from posted videos or pictures. The interest list generator 270 may also identify a topic associated with video/pictures based on associated textual metadata that describes the content of the video/pictures.

The interest list generator 270 may also infer topics of interest based on where users "check-in." In one embodiment, a check-in describes a single visit by a user to a geographic location. The interest list generator 270 may perform a topic analysis on the name of the location to identify a topic associated with the location. For example, if a user checks in at the Eukanuba Dog Show, the interest list generator 270 may identify a topic of "dogs," from the name of the location or from content (e.g., profile or posts) associated with a page that represents the location if available.

Similarly, the interest list generator 270 may infer topics of interest of users based on events attended by the users. Events, such as the Eukanuba Dog Show, may have their own pages where users indicate whether they are attending the event. The interest list generator 270 may perform a topic analysis on the page associated with an event to determine a topic associated with the event if a user indicates that he or she attended the event. Attending the event signifies the user's interest in the topic associated with the event.

The interest list generator 270 may also infer topics of interest of users based on the users "likes." In one embodiment, a "like" is a user's declared interest in an activity by another user in the social networking system 200. The social networking system 200 allows users to "like" another user's activity such as the user's posts or check-ins indicating a positive approval or interest in the activity. The interest list generator 270 may identify a topic associated with a content that has been "liked" by the user through the topic analysis previously described above.

Furthermore, the interest list generator 270 may also infer topics of interest based on advertising content that a user interacts with in the social networking system 200. A user's interaction with advertising content provided on the social networking system 200 such as clicking on an advertisement or purchasing a product discovered by way of an advertisement indicates a positive interaction with the advertisement. The interest list generator 270 may analyze the advertisement using the topical analysis described above to identify a topic associated with an advertisement that is positively interacted with by the user.

As mentioned previously, the interest list generator 270 may maintain topic counts for users and updates the topic counts based on identified topics of the various user activities described above. A topic count is associated with a topic and a user and indicates a number of times that the user has performed an activity in the social networking system 200 that is associated with the topic. Responsive to the topic count of a user exceeding a threshold, the interest list generator 270 may automatically suggest to the user to subscribe to an interest list associated with the topic of the topic count. Particularly, the interest list generator may match the topic associated with the topic count with the topic of an interest list and suggest that the user subscribe to the interest list. In one embodiment, the topic count exceeding the threshold signifies the user's interest in a topic to a degree of certainty that the interest list generator 270 can correctly assume that the user would be interested in joining an interest list associated with the topic. Accordingly, the interest list generator 270 may identify which friends of the curator to suggest to subscribe to an interest list based on the inferred interests of the friends. The interest list generator 270 may perform a similar analysis on activities of friends of current subscribers of an interest list to identify which friends to invite to join the interest list.

In another embodiment, the interest list generator 270 may also invite other users of the social networking system 200 to join an interest list based on their inferred interests even if those users lack a connection to the curator or any subscribers of an interest list. By inviting other users that lack a connection with the subscribers of an interest list, the social networking system 200 beneficially introduces users with common interests to each other thereby forming new connections.

Method for Adding Users to an Interest List

Figure 8:
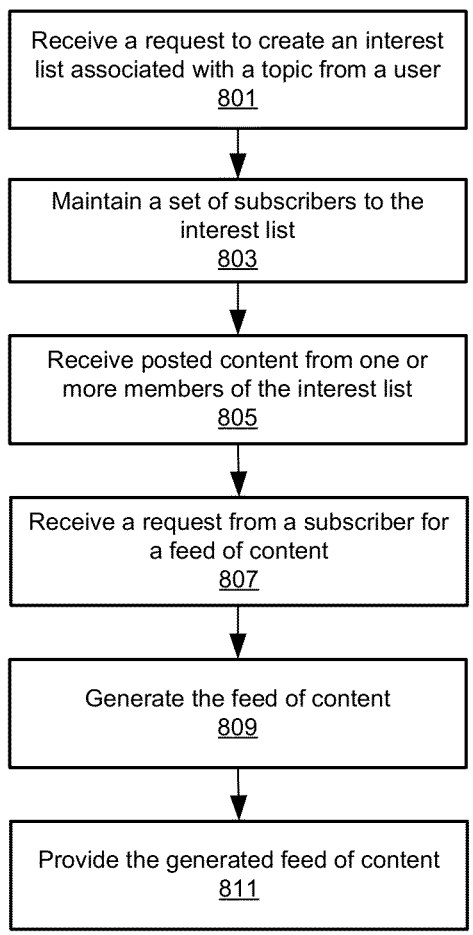
FIG. 8 illustrates a method flow diagram for creating an interest list for a user, in accordance with one embodiment.

Referring now to FIG. 8, one embodiment of a method performed by the social networking system 200 is shown for creating an interest list. Note that in other embodiments, other steps may be performed other than those illustrated in FIG. 8.

In one embodiment, the social networking system 200 receives 801 a request to create an interest list associated with a topic from a user. The user may specify in the request the topic associated with the interest list. For example, the social networking system 200 may receive the topic "dogs" for an interest list. The social networking system 200 maintains 803 a set of subscribers to the interest list. The subscribers may add themselves to the interest or may be added by the user that requested the creation of the interest list. The social networking system 200 receives 805 posted content from one or more members of the interest list. The posted content may be textual content, audio content, video content, and/or multimedia content that is associated with the topic of the interest list. The social networking system 200 receives 807 a request from a subscriber to the interest list for a feed of content associated with the interest list. The social networking system 200 generates 809 the feed of content that comprises the posted content received from the members of the interest list. The social networking system 200 provides 811 the generated feed of content for display to the subscriber to the interest list.

SUMMARY

The foregoing description of the embodiments herein has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

The embodiments described herein may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments herein is intended to be illustrative, but not limiting, of the scope of the invention, which is set forth in the following claims.

What is claimed is:

1. A computer-implemented method comprising:
receiving a request from a user of the social networking system to create an interest list comprising posted content that is associated with a topic;
maintaining a definition of members of the interest list, the members comprising users of the social networking system that can provide content that is included in the interest list;
maintaining a set of subscribers to the interest list, wherein the subscribers are users of the social networking system that receive the interest list;
receiving posted content from one or more of the members of the interest list;
receiving a request from a subscriber to the interest list for a display of content associated with the interest list;
generating the display of content that comprises the posted content received from the one or more members of the interest list; and
providing the generated display of content for display to the subscriber to the interest list.

2. The computer-implemented method of claim 1, wherein the plurality of members are not aware that they are included in the interest list.

3. The computer-implemented method of claim 1, wherein receiving the request from the user of the social networking system to create the interest list comprises:
   receiving a request from the user to add the plurality of members to the interest list.

4. The computer-implemented method of claim 1, further comprising:
   suggesting to the user a member to add to the interest list based on a number of posted content by the member in the social networking system that is associated with the topic of the interest list.

5. The computer-implemented method of claim 4, wherein suggesting to the user the member to add to the interest list is further based on a frequency of posted content that is associated with the topic of the interest list.

6. The computer-implemented method of claim 1, wherein at least one member of the interest list is also a subscriber to the interest list.

7. The computer-implemented method of claim 1, further comprising:
   receiving a request from another user of the social networking system to become a subscriber to the interest list; and
   adding the another user to the set of subscribers.

8. The computer-implemented method of claim 1, further comprising:
   identifying interests of users in the social networking system that are associated with the topic of the interest list; and
   inviting the users to subscribe to the interest list.

9. The computer-implemented method of claim 8, wherein the interests are identified from profiles of the users.

10. The computer-implemented method of claim 8, wherein identifying the interests of users comprises:
    inferring the interests of the users based on activities of the users in the social networking system.

11. The computer-implemented method of claim 10, wherein inferring the interests comprises:
    logging the activities of the users in the social networking system; and
    identifying which of the logged activities are indicative of the users' interest in the topic associated with the interest list.

12. The computer-implemented method of claim 11, wherein logging the activities comprises:
    logging posts by the users in the social networking system; and
    identifying, for each post, a topic associated with content of the post.

13. The computer-implemented method of claim 11, wherein logging the activities comprises:
    logging geographic locations in which the users in the social networking system indicate the users have visited; and
    identifying, for each geographic location, a topic associated with the geographic location.

14. The computer-implemented method of claim 11, wherein logging the activities comprises:
    logging events in which the users in the social networking system indicate the users have attended; and
    identifying, for each event, a topic associated with the event.

15. The computer-implemented method of claim 11, wherein logging the activities comprises:
    logging declared interests in other users' activities by the users in the social networking system; and
    identifying, for each declared interest, a topic associated with the declared interest.

16. The computer-implemented method of claim 8, wherein the users are connected to the user in the social networking system.

17. The computer-implemented method of claim 8, wherein the users are not connected to the user in the social networking system.

18. The computer-implemented method of claim 1, wherein logging the activities of the connections comprises:
    logging positive interactions with advertising content by the users in the social networking system, wherein a positive interaction indicate interest in the advertising content; and
    identifying, for each positive interaction, a topic associated with the advertising content associated with the positive interaction.

19. A computer program product comprising a non-transitory computer readable storage medium storing executable instructions, the instructions when executed perform steps comprising:
    receiving a request from a user of the social networking system to create an interest list comprising posted content that is associated with a topic;
    maintaining a definition of members of the interest list, the members comprising users of the social networking system that can provide content that is included in the interest list;
    maintaining a set of subscribers to the interest list, wherein the subscribers are users of the social networking system that receive the interest list;
    receiving posted content from one or more of the members of the interest list;
    receiving a request from a subscriber to the interest list for a display of content associated with the interest list;
    generating the display of content that comprises the posted content received from the one or more members of the interest list; and
    providing the generated display of content for display to the subscriber to the interest list.

20. The computer program product of claim 19, wherein the instructions when executed perform steps comprising:
    suggesting to the user a member to add to the interest list based on a number of posted content by the member in the social networking system that is associated with the topic of the interest list.

* * * * *